US008977385B2

(12) United States Patent
Bowers et al.

(10) Patent No.: US 8,977,385 B2
(45) Date of Patent: Mar. 10, 2015

(54) SYSTEM AND METHOD FOR TRACKING A MAIL ITEM THROUGH A DOCUMENT PROCESSING SYSTEM

(75) Inventors: Brian Bowers, Mundelein, IL (US); Steven Seburn, Buffalo Grove, IL (US); Steven Ksiazek, Schaumburg, IL (US); Gary Van Ermen, Palatine, IL (US); Walter S. Conard, Lake Villa, IL (US)

(73) Assignee: Bell and Howell, LLC, Durham, NC (US)

( * ) Notice: Subject to any disclaimer, the term of this patent is extended or adjusted under 35 U.S.C. 154(b) by 575 days.

(21) Appl. No.: 12/466,713

(22) Filed: May 15, 2009

(65) Prior Publication Data

US 2009/0218262 A1 Sep. 3, 2009

Related U.S. Application Data

(63) Continuation-in-part of application No. 11/199,259, filed on Aug. 9, 2005, now Pat. No. 7,741,575.

(60) Provisional application No. 60/629,407, filed on Nov. 22, 2004, provisional application No. 61/053,935, filed on May 16, 2008.

(51) Int. Cl.
*G06F 7/00* (2006.01)
*B07C 3/00* (2006.01)
*G07B 17/00* (2006.01)

(52) U.S. Cl.
CPC ............ *B07C 3/00* (2013.01); *G07B 17/00661* (2013.01); *G07B 2017/00483* (2013.01); *G07B 2017/00677* (2013.01)
USPC ........... 700/224; 235/375; 235/385; 705/406; 705/408; 705/402; 700/226; 209/584

(58) Field of Classification Search
USPC ........................................................ 700/224
See application file for complete search history.

(56) References Cited

U.S. PATENT DOCUMENTS 4,908,768 A 3/1990 Gelfer et al.
5,249,687 A 10/1993 Rosenbaum et al.

(Continued)

FOREIGN PATENT DOCUMENTS

EP 0 481 569 A 4/1992

OTHER PUBLICATIONS

United States Office Action issued in U.S. Appl. No. 12/078,499 dated Jan. 3, 2011.

(Continued)

*Primary Examiner* — Gene Crawford
*Assistant Examiner* — Kyle Logan
(74) *Attorney, Agent, or Firm* — McDermott Will & Emery LLP

(57) ABSTRACT

Processing and tracking of individual mail items processed through a document processing system such as a sorter or inserter utilize a mail item identifier that is unique with respect to each individual mail item. A mail item may have a postal authority approved code representing or containing its associated unique identifier. If not, an identifier is generated and a corresponding postal authority approved code is applied to the mail item. Processing entails associating the unique mail item identifier for each respective mail item with collected metadata for the respective mail item and storing the identifier and associated the metadata. In a sorter example, each mail item is sorted into a postal sort group, and the processing entails identifying the sort group to which each item is sorted and storing the identified sort in association with the unique mail item identifier.

7 Claims, 3 Drawing Sheets

(56) References Cited

U.S. PATENT DOCUMENTS

| | | | | |
|---|---|---|---|---|
| 5,419,440 | A | 5/1995 | Picoult | |
| 5,420,403 | A * | 5/1995 | Allum et al. | 235/375 |
| 5,459,670 | A | 10/1995 | Johnson et al. | |
| 5,475,603 | A | 12/1995 | Korowotny | |
| 5,841,658 | A * | 11/1998 | Bouchard | 705/406 |
| 6,098,057 | A | 8/2000 | Dlugos | |
| 6,101,487 | A | 8/2000 | Yeung | |
| 6,135,292 | A | 10/2000 | Pettner | |
| 6,178,411 | B1 * | 1/2001 | Reiter | 705/408 |
| 6,303,889 | B1 | 10/2001 | Hayduchok et al. | |
| 6,311,892 | B1 | 11/2001 | O'Callaghan et al. | |
| 6,501,041 | B1 | 12/2002 | Burns et al. | |
| 6,575,358 | B2 | 6/2003 | O'Callaghan et al. | |
| 6,655,683 | B2 | 12/2003 | Engarto et al. | |
| 6,674,038 | B1 | 1/2004 | Latta | |
| 6,697,500 | B2 | 2/2004 | Woolston et al. | |
| 6,749,194 | B2 | 6/2004 | Hanson et al. | |
| 6,793,136 | B2 | 9/2004 | Wells et al. | |
| 6,826,548 | B2 | 11/2004 | Hungerpiller et al. | |
| 6,945,458 | B1 * | 9/2005 | Shah et al. | 235/385 |
| 6,998,558 | B2 | 2/2006 | Forella et al. | |
| 7,048,191 | B2 | 5/2006 | Park et al. | |
| 7,397,010 | B2 | 7/2008 | Wilke | |
| 7,522,971 | B2 | 4/2009 | Brehm et al. | |
| 7,745,754 | B2 | 6/2010 | Conard et al. | |
| 8,063,332 | B2 * | 11/2011 | Bowers et al. | 209/584 |
| 2002/0029202 | A1 * | 3/2002 | Lopez | 705/406 |
| 2002/0053533 | A1 | 5/2002 | Brehm et al. | |
| 2002/0069187 | A1 * | 6/2002 | Barnum et al. | 705/408 |
| 2003/0200113 | A1 | 10/2003 | Latta | |
| 2004/0030661 | A1 * | 2/2004 | Amato | 705/406 |
| 2004/0049316 | A1 * | 3/2004 | Pintsov et al. | 700/226 |
| 2004/0054552 | A1 | 3/2004 | Amonette et al. | |
| 2004/0188522 | A1 | 9/2004 | Ashaari | |
| 2004/0220695 | A1 * | 11/2004 | Pintsov et al. | 700/224 |
| 2005/0216119 | A1 | 9/2005 | Hamilton | |
| 2006/0080266 | A1 * | 4/2006 | Kiani et al. | 705/402 |
| 2006/0102529 | A1 | 5/2006 | Wilke | |
| 2007/0239313 | A1 * | 10/2007 | Goyal et al. | 700/224 |
| 2008/0000817 | A1 | 1/2008 | Kostyniuk et al. | |
| 2008/0179225 | A1 * | 7/2008 | Bowers et al. | 209/584 |
| 2009/0014364 | A1 * | 1/2009 | Conard et al. | 209/584 |
| 2010/0040256 | A1 * | 2/2010 | Rundle | 382/101 |
| 2010/0082152 | A1 * | 4/2010 | Mishra et al. | 700/226 |
| 2011/0192770 | A1 * | 8/2011 | Goertz et al. | 209/592 |

OTHER PUBLICATIONS

European Search Report issued in European Patent Application No. EP 05025368.1-2307 dated on Jan. 27, 2009.

United States Office Action issued in U.S. Appl. No. 12/467,043 dated Jul. 5, 2011.

United States Notice of Allowance issued in U.S. Appl. No. 11/199,259 dated Apr. 15, 2010.

United States Office Action issued in U.S. Appl. No. 12/078,499, mailed Jul. 16, 2010.

European Search Report issued in European Patent Application No. EP 05025368.1 dated Jul. 6, 2009.

Partial European Search Report issued in European Patent Application No. 05 02 5368 dated Dec. 18, 2008.

United State Office Action issued in U.S. Appl. No. 12/078,499 dated Sep. 22, 2011.

United States Office Action issued in U.S. Appl. No. 11/199,259, mailed Oct. 15, 2009.

European Office Action issued in European Patent Application No. EP 05 025 368.1 dated Aug. 4, 2011.

United States Notice of Allowance issued in U.S. Appl. No. 12/467,043 dated Dec. 19, 2011.

* cited by examiner

FIG. 2a

| Type | Field | Digits |
|---|---|---|
| Tracking Code | Barcode Identifer **204** | 2 |
| | Service Type Identifer **206** | 3 |
| | Mailer ID **208** | 6 or 9 |
| | Unique Identifier (unique number and / or ACS match back code) | 9 or 6 |
| Routing Code | Delivery Point Identifier **212** | 0, 5, 9, or 11 |

Unique Mail Item Identifier 202

200

FIG. 2b

SYSTEM AND METHOD FOR TRACKING A MAIL ITEM THROUGH A DOCUMENT PROCESSING SYSTEM

RELATED APPLICATIONS

This application is a continuation-in-part of U.S. patent application Ser. No. 11/199,259 Filed Aug. 9, 2005 now U.S. Pat. No. 7,741,575 (Publication No. US 2006/0108266 A1), which claims the benefit of U.S. Provisional Application No. 60/629,407 Filed Nov. 22, 2004 the disclosures of which are entirely incorporated herein by reference.

This also application claims the benefit of U.S. Provisional Application No. 61/053,935 Filed May 16, 2008, the disclosure of which also is entirely incorporated herein by reference.

TECHNICAL FIELD

The subject matter discussed herein relates to technologies for mail item processing, and particularly, for directly associating a mail item with its designated postal group and tracking the mail item in a document processing system.

BACKGROUND

Document processing facilities often use high speed document processing machines such as sorters, to sort and direct mail items appropriately to one or more mail bins for distribution. Various types or stages of processing may occur during sorting of the mail items as they are transported at high speeds along a transport path of the sorter via a system of mechanized pulleys, levers and rollers. Such processes may include, but are not limited to imaging of each mail item at various moments of transport, interpretation of address components (e.g., recipient addresses, ZIP codes, barcodes) based on the image as marked upon the mail items for enabling association of each mail item with a sort scheme, printing upon the mail item, application of labels, opening or cutting of the mail item, etc. Generally, these processes are coordinated by one or more computers operating in connection with the sorter. In a multi-sorter environment, where a mailing is distributed for processing amongst multiple sorters, a server may act as a central administrator of sorter activity, i.e. facilitating data exchange, managing job scheduling and processing, coordinating sort schemes amongst sorter devices, etc.

The common goal of any sort operation is to arrange a plurality of disparate mail items into mail groups that conform to defined sort criteria, such as the arrangement of mail items into groups according to postal authority standards. Generally, the postal grouping to which a mail item belongs is based on the delivery point identifiers indicated upon the mail item, such as the ZIP Code designation, address data, etc. Other factors regarding the mail item, such as weight class or postage application may further affect how it is classified by the postal authority and hence delivered via the postal network. Regardless of classification, however, a single postal grouping (or postal sort group) may include mail items possessing a plurality of delivery point identifiers or only one (e.g., one or more ZIP Code designations). Sort processing of disparate mail items into mail groupings associated by common postal authority recognized delivery point identifiers leads to increased postal processing and postal authority work sharing discounts. Specifically, postal sort groups may be defined in a sorting operation to sort mail items into postal sort groups that are acceptable to the postal authority and/or enable the mail owner to receive discounts.

Despite being optimized for processing mail items into postal sort groups as described above, document processing devices such as sorters are quite inept at maintaining data that distinctly associates a particular mail item with a postal sort group. Consequently, postal authority documentation regarding a postal sort group is not able to reflect the relationship between the postal sort group and the mail items that may belong to that group.

Specifically, it is difficult to precisely track an individual mail item through or across one or more document processing systems into a respective sort group, whether that sort group be defined according to postal regulations, physical characteristics, associated functions performed on or to be performed on the item, the identity of the originator of the mail item, fiscal attributes associated with the mail item, etc.

Therefore, a need exists for a system and method directly associating a mail item with its designated postal sort group and tracking the mail item in a document processing system.

SUMMARY

Technologies disclosed herein generally encompass methods for and systems and possibly system software to facilitate tracking one or more mail items processed by a document processing system, particularly wherein the tracking entails directly associating a mail item with its designated sort group.

It is desirable to provide a method for tracking mail items processed by a document processing system. The method includes determining whether or not each respective mail item includes thereon a machine readable postal code containing a representation of a unique mail item identifier for the respective mail item during processing of each respective one of the mail items by the document processing system. At least one of the respective mail items is identified as not including such a machine readable postal code based on the determining step. A unique mail item identifier is generated for each respective identified mail item. A postal code is applied to each identified mail item containing a representation of the generated unique mail item identifier for the respective identified mail item. Each unique mail item identifier and each postal code conform to a postal authority standard. Metadata associated with each respective mail item in association with the unique mail item identifier of the respective mail item is stored to form a database of information regarding the mail items processed through the document processing system.

It is also desirable to provide an article of manufacture. The article includes at least one machine readable storage medium and program instructions embodied in the storage medium. The program instructions are executed by at least one programmable computer running in association with a document processing system causing the programmable computer to perform functions for tracking mail items processed by the document processing system. The functions include determining whether or not each respective mail item includes thereon a machine readable postal code containing a representation of a unique mail item identifier for the respective mail item during processing of each respective one of the mail items by the document processing system. Based on the determining step, at least one of the respective mail items is identified as not including such a machine readable postal code. A unique mail item identifier is generated for each respective identified mail item. An application of a postal code to each identified mail item containing a representation of the generated unique mail item identifier for the respective identified mail item is initiated. Each unique mail item identifier and each postal code conform to a postal authority standard. Metadata associated with each respective mail item in association with the unique mail item identifier of the respective mail item is stored to form a database of information regarding the mail items processed through the document processing system.

Still further, it is desirable to provide for a document processing system. The system includes a reader device adapted to capture data as marked upon each respective mail item. A processor/controller is adapted to obtain a data for a unique mail item identifier from a postal code read by the reader device from each respective mail item already having a postal code conforming to a postal authority standard thereon; and to generate and assign a unique mail item identifier conforming to postal authority standard to each respective mail item read by the reader device that does not already have a postal code conforming to postal authority standard thereon. A sorter associated with the processor/controller is adapted to sort each respective mail item into one of a plurality of sort groups. Memory associated with the processor/controller, is included for storing metadata and identification of the sort group to which each respective mail item is sorted in association with the unique mail item identifier for the respective mail item.

Yet another aspect includes a method of generating postal authority documentation for mail items processed by a document processing system. The method includes associating a unique mail item identifier conforming to a postal authority standard, including a mailer identifier identifying a mailer sending the mail items and a number which is maintained as unique with respect to mail items from the identified mailer for a specified period of time, with each respective one of the processed mail items. A barcode conforming to a postal authority standard is applied to each respective mail item for which a barcode was not already present. The barcode contains at least the unique mail item identifier associated with the respective mail item for which a barcode was not already present. The method includes storing in a database, identification of a respective sort group to which each respective mail item is sorted, from among a plurality of sort groups, in association with the mail item identifier associated with the respective mail item. A report is generated from the database that includes association of one of the sort groups with mail item identifiers associated with mail items sorted into the one sort group.

Another aspect includes an article of manufacture. The article includes at least one machine readable storage medium and program instructions embodied in the storage medium. The execution of the program instructions by at least one programmable computer associated with a document processing system causes the programmable computer to control the document processing system to perform functions. The functions include associating a unique mail item identifier conforming to a postal authority standard, including a mailer identifier identifying a mailer sending the mail items and a number which is maintained as unique with respect to mail items from the identified mailer for a specified period of time, with each respective one of the processed mail items. A barcode conforming to postal authority standard is applied to each respective mail item for which a barcode was not already present. The barcode contains at least the unique mail item identifier associated with the respective mail item for which a barcode was not already present. Stored in a database, is identification of a respective sort group to which each respective mail item is sorted, from among a plurality of sort groups, in association with the mail item identifier associated with the respective mail item. A report is generated from the database, including association of one of the sort groups with mail item identifiers associated with mail items sorted into the one sort group.

Other concepts relate to unique software for implementing the mail item tracking, for example, with associated sort group information. A software product, in accord with any of these concepts, may take the form of an article of manufacture which includes at least one machine-readable medium and information carried by the medium. The information carried by the medium may be program instructions, for example, for a computer associated with a document processing system, which cause the programmable computer to perform functions or control the document processing system to perform functions related to mail item tracking and/or report generation, such as functions similar to steps of one or more of the methods outlined above.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2*a* depicts exemplary data, including that for a unique mail item identifier capable of being associated with a mail item destined for a sort group.

FIG. 2*b* depicts a barcode identifier based on the exemplary data containing the unique mail item identifier.

DETAILED DESCRIPTION

Figure 1:
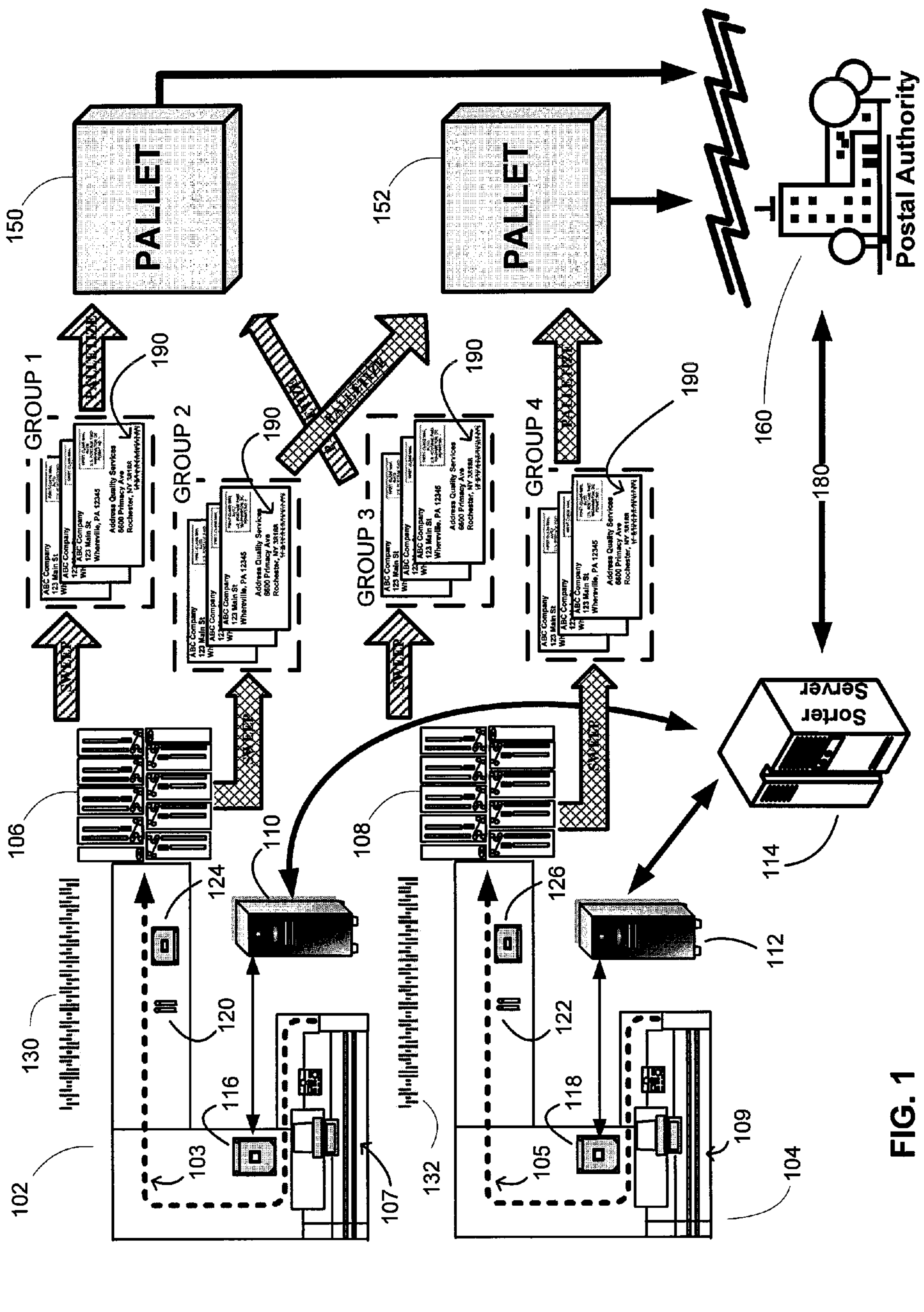
FIG. 1 depicts an exemplary document processing environment for processing mail items into approved sort groups.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

To improve reporting and/or tracking functions with respect to mail items handled through a document processing system, each mail item has an associated unique mail item identifier. Said unique mail item identifier, when associated or assigned to a given mail item enables a consistent means of validating the presence and processing activity of said mail item. The mail item identifier may be obtained by reading or decoding a postal authority approved code such as a barcode as placed on the mail item, if such a postal authority approved code is already present. Exemplary postal authority approved codes from the perspective of the United States Postal Service may include, but is not limited to, PLANET, POSTNET, Intelligent Mail Barcode (IMB), etc. Of course those skilled in the art will recognize that the cited examples do not limit the scope and application of the techniques and concepts presented herein. Furthermore, the exemplary techniques described herein may be applicable to any mail item delivery service or carrier in various geographic jurisdictions including private posts and courier services. Indeed, any type of postal code, be it barcode based, alpha-numeric, graphical or other may be employed within the context of the examples herein.

If a unique mail item identifier is not already assigned, then a unique identifier is assigned to the mail item and a postal authority approved code containing a representation of the assigned identifier is applied to the mail item. The unique mail item identifier and/or the postal authority approved code containing it conforms to at least one postal authority standard. Other data regarding each mail item is stored in a database in association with the unique identifier of the mail item. The other data in the database may include the sort group to which the document processing system assigns/sorts the mail item and/or a variety of different types of metadata related to the mail piece or item. The document processing system tracks processing of the mail item; and tracking results, such as the ultimate postal sort group, departmental sort group or other sort classification are stored in the database in a manner linked to or associated with the unique mail item identifier. A variety of reports can then be generated from the database, using the mail item identifiers, the sort group information and/or the mail item metadata.

Use of the postal authority approved code and unique mail item identifier conforming to the postal authority standard allows use of said postal authority approved code and unique mail item identifier without the need to generate and apply some other readable form of tracking or control information. Also, the postal authority may itself track its handling of the mail item using that same code and identifier, and the mailer and the postal authority may share or link their information if desired.

The use of a unique identifier for each mail item and the storing of various data in a manner associated with or linked to that identifier, for each respective mail item, allows the reports to provide a very high degree of integrity, that is to say, to efficiently report on the details/processing of at least substantially all of the mail items successfully handled through the document processing system. For example, it becomes practical to generate a report for a postal sort group which includes the unique mail item identifier (and possibly other data) for each and every mail item sorted into that group (to at least a fairly high percentage accuracy or degree of certainty). As another example, it becomes possible to process information from the database to generate a report for a large mail run that reports the postal sort groups (and possibly other data) for all mail items processed through the document processing system (to at least a fairly high percentage accuracy or degree of certainty). In yet another example, in instances where a postal grouping of mail items is not desired, reports pertinent to other group criteria (e.g., department, weight class, client profile) singularly or in combination as defined may be generated. More advantages regarding the examples presented herein are discussed in later sections of the specification.

Turning now to the FIG. 1, an exemplary document processing environment 100 for processing mail items into postal authority approved sort groups is depicted. It is understood that the document processing environment 100 shown in FIG. 1 is merely one example of a document processing environment 100 as contemplated herein. Furthermore, those skilled in the art will recognize that while the examples herein pertain to postal authority sort groups, other types of sort groups may apply. Indeed, it is not uncommon to group mail items in various ways with respect to the processing requirements, capabilities and needs of the party performing the sort—i.e., inbound sorting versus outbound sorting.

The document processing environment 100 includes a plurality of document processing devices 102 and 104. In the example shown in FIG. 1, the document processing devices 102 and 104 are sorters 102 and 104, each capable of processing a plurality of mail items at high speeds into one or more sort bins 106 and 108 respectively. However, it is contemplated that the document processing devices 102 and 104 may be other processing devices, such as, for example, inserters. Each sorter features a transport path 103 and 105 respectively, along which mail items are moved from a magazine in-feed system 107 and 109 to the sort bins 106 and 108, each sort bin 106/108 including a collection of pockets intended for holding mail items. Various additional processing devices operate upon mail items as they are guided along the transport path 103 and 105 to the sort bins, including but not limited to: one or more printers 120 and 122 for enabling the application of additional markings onto a mail item such as barcodes 130 and 132, a barcode verification system 124 and 126 for validating barcode integrity and application, reader systems 116 and 118 for detecting and interpreting delivery point identifiers as placed onto the mail item and other devices. It is understood that the additional processing devices will vary depending on the context and application of the document processing environment 100.

The sort bins 106 and 108 are populated with mail items in accord with a sort scheme (i.e., instructions that dictate the behavior of the sorter 102/104). A sort scheme may be based, for example, on postal authority mail grouping rules that dictate which ZIP codes may be sorted together, such as for purposes of receiving mail discounts. In the document processing environment 100 shown in FIG. 1, each mail item includes a delivery point identifier (delivery point identifiers are more commonly known as ZIP codes, the five, nine or eleven digit number identifying the delivery point of the mail item) and is placed in a given sort bin 106/108 based on the detection and/or interpretation of the delivery point identifier. In the example in FIG. 1, delivery point identifiers are analyzed during transport at least in part by reader devices 116 and 118, which are capable of relaying image data representative of the delivery point identifiers present on the mail item to a recognition system (such as, for example, Object Character Recognition), or an address matching engine for analysis against postal authority address data.

As shown, the sort scheme may be a function of the delivery point identifiers arranged according to postal authority mail grouping rules (also referred to commonly as a postal ZIP scheme), limited by the resource constraints of the sorter 102/104 (such as, for example, the number of pockets available) and other considerations. Alternatively, the sort scheme may be a function of custom sort criteria not expressly associated with postal authority based data, including but not limited to, organizational or departmental designations, client profile data, data representative of a particular processing device for which a mail item is processed, physical characteristic data corresponding to mail items, etc. Indeed, any data usable for distinguishing mail items from others may be suitable for enabling group classification and is within the scope of the examples herein.

Sort scheme data is generally maintained and executed by a sorter computer 110 and 112, which operates in connection with the sorter device 102 and 104. Alternatively, in a multi-device environment 100 as depicted in the exemplary FIG. 1, respective sorter computers 110 and 112 may further communicate with a sorter server 114, which facilitates data exchange and coordinates mail processing tasks between sorters 102 and 104. The sorter computers 110 and 112 and the sorter server 114 each include a processor/controller that controls the operation of the sort computers 110 and 112 and the sorter server 114, respectively, and consequently the operation of the various devices within the document processing environment 100 in accord with programming in program storage in or associated with each such computer-based device. Moreover, the sorter server 114 may facilitate subsequent pass processing between the multiple sorters 102 and 104 in instances where additional processing of mail items is required to generate maximum postal authority discounts with respect to a sort scheme. Even still, the sorter server 114 may also facilitate communication 180 between the mail processing environment 100 and the postal authority, such as to fulfill data reporting requirements or the like. Whether processed during a first or subsequent passes, the mail items are eventually manually swept from the sort bins 106 and 108 into mail trays; the mail trays being further aggregated to formulate distinct postal sort groups.

In the exemplary system 100 of FIG. 1, the postal sort groups are labeled GROUP 1 through GROUP 4. Of course, those skilled in the art will recognize that the number of actual sort groupings may vary depending on the sort scheme and mail items to be processed. As presented herein, a postal sort group represents a plurality of mail items having common delivery point identifiers that correspond to a postal authority convention (or scheme) that dictates how the mail items are to be arranged together. This convention may be on the basis of various factors but in the examples herein, the scheme is based on delivery point identifiers, or ZIP codes. So, for example, assume that the current postal scheme calls for the following: all mail items marked with ZIP Code 60616-60628 and 60632 to be grouped together, all mail items marked with ZIP Code 60645-47 and 60649 to be grouped together, all mail items marked with ZIP Code 60633-40 to be grouped together, and all mail items marked with ZIP Code 60090-91 and 60694 to be grouped together. Note that in this assumption, this is the current postal scheme, as those skilled in the art will recognize that postal schemes periodically change in response to the geographical, functional, tactical and oft time social dynamics that the postal authority must account for to ensure proper delivery of mail items through its vast network channels.

With this exemplary scheme in mind, sorters 102 and 104 process a plurality of disparate mail items indicating various ZIP Code designations—i.e., ranging from 60011 to 70900. As the sort scheme for the sorters 102 and 104 is based on the sort scheme, mail items conforming to the above described postal schemes are sorted into corresponding pockets within sort bins 106 and 108. Hence, sort bin 106 operating in connection with sorter 102 features one or more mail pockets exclusively containing mail items having ZIP Code designations 60616-60628 and 60632, while other mail pockets exclusively maintain mail items marked with ZIP Code 60645-47 and 60649. Alternatively, finer sort levels (as may be required by the sort scheme) may require pockets that exclusively maintain a limited number of mail items conforming to the range of ZIP Codes; for example, one mail item per pocket. In any case, after the mail items are sorted into the pockets, the mail pockets are swept into trays conforming to the appropriate sort group—i.e., GROUP 1 through GROUP 4—to which each sorted mail item belongs.

Even further, pluralities of postal sort groups are further aggregated into pallets 150 and 152 for shipment to a subsequent destination. In the exemplary figure, GROUP 1 and GROUP 3 mail items are palletized, while GROUP 2 and GROUP 4 are palletized; the pallets also being arranging in accord with postal scheme requirements or with respect to a special sort scheme (e.g., department name/type, client name/type, weight class). The subsequent destination may be another document processing environment 100 wherein additional sorting of the received groups of mail is to occur, one or more internal mail stops within an organization or may be a channel within the postal authority network 160 (e.g., a sectional center facility, a bulk mail center) wherein postal processing occurs.

To facilitate the tracking of mail items displaying various delivery point identifiers as they are transported through the sorter and eventually placed with their respective postal sort group (e.g., GROUPS 1-4 of FIG. 1), a convenient tracking technique is required. More specifically, the tracking technique may enable each mail item to be uniquely identified and thereby associated with its respective sort group and/or other mail item data that may be of interest such as for reporting purposes. As discussed more fully below, each mail item processed through the system will have an postal authority approved code thereon, or if not, will be imprinted with a code during handling by the document processing system. On each respective mail item, the postal authority approved code will include or encode a representation of a mail item identifier that uniquely identifies the particular respective mail item. In the example, each unique mail item identifier and each postal authority approved code conforms to postal authority standards.

FIG. 2*a* depicts an exemplary data structure intended for a barcode, and FIG. 2*b* depicts a barcode type postal authority approved code based on such data. The data structure generated for encoding into the barcode includes sufficient information to form a unique mail item identifier, that is to say a reliably unique identification for an individual mail piece or item that will be unique at least for some minimum set period of time. As a result, the identifier and thus the barcode containing the data including the identifier may enable tracking of each individual mail item destined for placement with a particular postal sort group and associated reporting functions. In particular, in the examples provided herein, the exemplary barcode data structure and resulting barcode type are based on a postal authority OneCode standard or in the illustration, a standardized Intelligent Mail Barcode ("IMB") 200. Nonetheless, those skilled in the art will recognize that the OneCode or the IMB 200 are merely examples of barcode identifier types conforming to respective postal standards that may be used as part of the present solutions and the discussion of those examples does not limit the scope and application of the techniques and concepts presented herein. Indeed, any type of conforming identifier and postal authority approved code imprint, be it barcode based, alpha-numerical, graphical or other may be employed within the context of the examples herein.

As shown in FIG. 2*b*, the IMB 200 is a height modulated barcode that uses varying vertical bar types to encode data as shown in FIG. 2*b*. When used to qualify for automation discounts, the IMB 200 can be placed in the address block or in the barcode clear zone, generally found on the lower right corner 190 of a mail item, as depicted in FIG. 1. The IMB 200 contains or encodes a 31-digit identifier, with fields for encapsulating various data as shown in FIG. 2*a*. Data fields encoded into the IMB 200 (FIG. 2*a*) include, but are not limited to: a two-digit barcode identifier 204, a three-digit service type identifier 206, a six or nine-digit mailer identifier 208, a nine or six-digit unique number 210 or, alternatively, address correction service ("ACS") match back code 210, and a delivery point identifier 212 (the ZIP code that can be zero, five, nine or eleven-digits). The mailer identifier 208 is generally defined by the postal authority based on the mailers' annual mail volume; data maintained by the sorter server 114 or by the sorter computers 110 and 112 upon assignment. The service type identifier 206 specifies a particular postal authority approved mail class and service(s) to be executed upon the mail item, such as First Class with CONFIRM, ACS, etc in the case of the United States Postal Service (USPS). In the present discussion and in the IMB type example, the unique number is "unique" in that it is used on only one mail item of the identified mailer for a period of time, typically specified by the postal authority in the applicable standard, although the mailer may reuse the number after expiration of the specified time period. The unique number 210 in the IMB for example may be assigned at the discretion of the mailer, and according to present the postal authority standard for IMB, must be certifiably unique for at least 45 days (the specified time period in the IMB example). Alternatively, an ACS match back code 210 may be used in place of the unique number 210. In any case, the unique number 210 must conform to a postal authority standard and cannot simply be a sequence number or other non-conforming number. The delivery point identifier 212 contains ZIP Code data of varying ranges (e.g., 5-digit ZIP versus 11-digit ZIP).

In the IMB example, the combination of the unique number 210 and the mailer identifier 208 is one example of what is referred to herein as a unique mail item identifier 202. Of course, those skilled in the art will recognize that one or more combinations of data fields may comprise the unique mail item identifier encoded and/or imprinted on the mail item as a barcode or other form of readable postal authority approved code. The unique mail item identifier 202 acts as a "license plate," distinctly identifying each mail item as it is processed in the document processing environment 100. Further, as described above, the unique mail item identifier 202 conforms to a postal authority standard, which improves its usefulness and applicability across various document processing environments 100.

Figure 3:
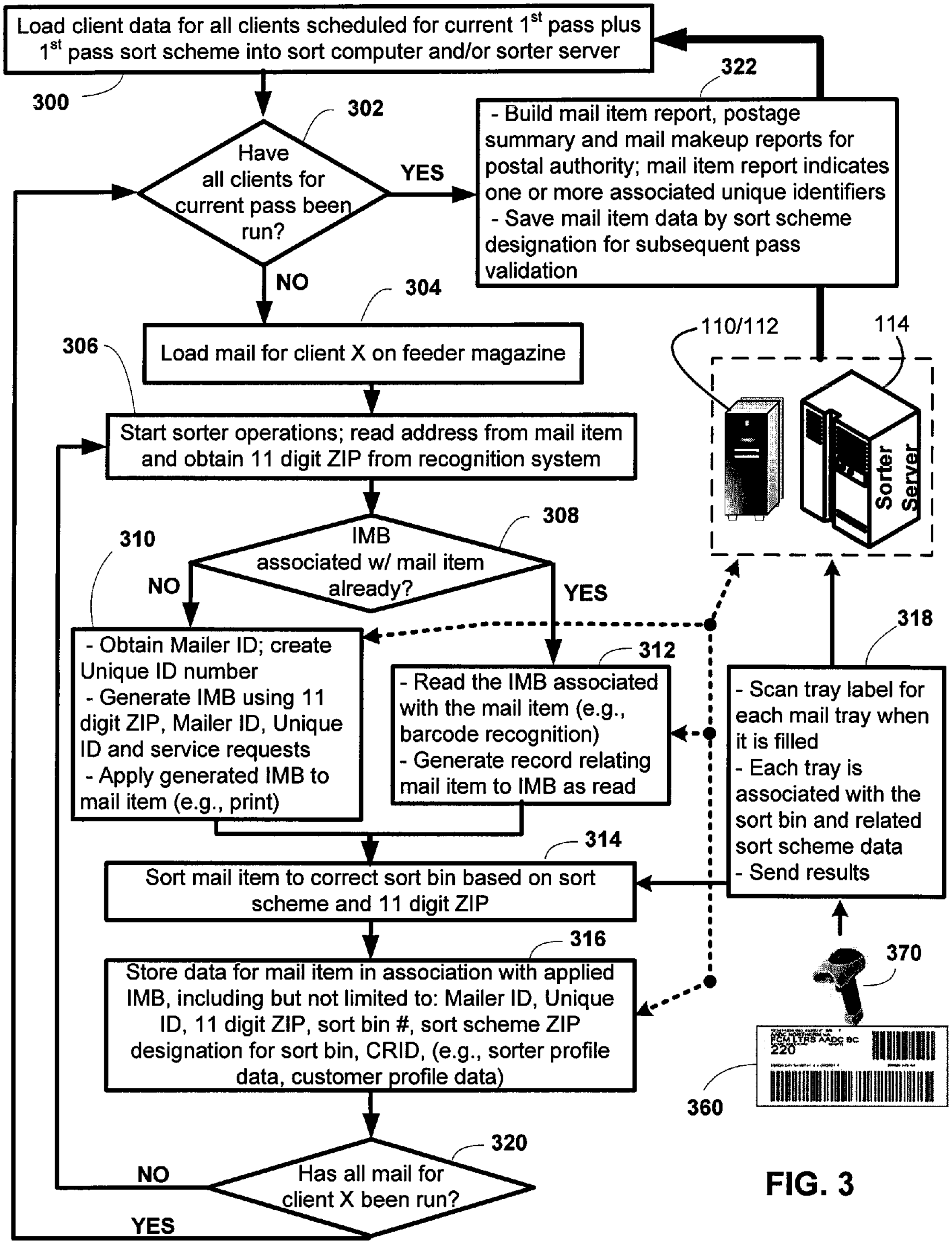
FIG. 3 is an exemplary process by which a mail item is tracked through a document processing device for ultimate association with a sort group.

While various other details regarding the IMB 200 may be emphasized, the discussion will proceed to FIG. 3, which outlines an exemplary process by which a mail item employing a barcode such as the IMB 200 to carry the readable unique mail item identifier may be tracked through a document processing environment 100 for ultimate association with a postal sort group. Again, those skilled in the art will recognize, however, that the IMB 200 is only one of many other types of present day and future identifier implementations suited for this purpose.

The mail processing task within a mail processing environment 100, as in the multi-device sorting environment of FIG. 1, begins with entry and loading of client data for all scheduled clients along with the appropriate sort schemes, into the sort computer 110/112 and/or sorter server 114 (event 300). Data entered or loaded may include, but is not limited to, client information such as the client's assigned mailer identifier 208, mail type to be processed, mail volume to be processed, service request information, billing information, etc. This process may also include a load distribution scheme, where the mail volume is segregated amongst sorters 102 and 104 for work sharing purposes. Assuming the sorters 102 and 104 are free (event 302), mail items are loaded for that particular client into the magazine in-feed 107 and 109 portion of the sorters 102 and 104, respectively (event 304). Once loaded, sorting operations can commence (event 306) for each respective mail item.

Commencement of sort operations includes procession of the mail items along the magazine in-feed 107 and 109 to respective transport paths 103 and 105; each item being fed individually for individual processing. During transport, any data marked upon the mail item—i.e., address block data—is read by a reader device 116/118. Having imaged the mail item, the reader device 116/118 is also able to detect the presence of a unique mail item identifier 202, such as one coded within an IMB 200, already residing on a mail item (event 308). If no unique mail item identifier 202 resides upon the mail item, one must be created and placed on the mail item (event 310). In the case where the unique mail item identifier 202 is to be contained within a barcode, such as an IMB 200, creating a unique mail item identifier 202 may include compiling the requisite data (ala FIG. 2*a*) and creating the barcode (ala FIG. 2*b*) including the barcode identifier 204, the service type identifier data 206 and the delivery point identifier 212 (e.g., 11-digit ZIP code data as read from the mail item) (the service type identifier data 206 being assigned from the loaded client data). The resulting data structure and thus the new IMB 200 further includes the unique mail item identifier 202 which is generated using the mailer identifier 208 (the mailer identifier 208 being assigned from the loaded client data) and the unique number 210 generated to identify the particular mail item.

At least some of the data required for generation of the IMB 200 also acts as metadata associated with the mail item. For example, where the mailer identifier 208 and the unique number 210 form the unique mail item data, other data such as the two-digit barcode identifier 204, the three-digit service type identifier 206, the mailer identifier 208, and the delivery point identifier 212, may be considered as metadata. Other metadata related to the mail item may also be retrieved and stored in association with the unique mail item identifier or "license plate" embodied in the IMB 200, including but not limited to postage application data, weight data, timestamp data, error data, etc. Those skilled in the art will recognize that any type of data useful for characterizing or enabling identification of a mail item, be it for characterization by the mailer or postal authority, may be suitable for use as metadata. Furthermore, skilled artisans will recognize that it may be advantageous to track the metadata associated with each unique mail item identifier 202 as described further below.

Once created, the IMB 200 is applied to the mail item, such as by way of a printing device 120/122. Subsequently, the IMB 200 is validated by the barcode verification system 124 and 126.

A record associating the unique mail item identifier 202 and the various pieces of metadata is maintained for each mail item processed. For each case where the item did not already have a unique mail item identifier 202, a record is maintained regarding the IMB 200 as applied, the mail item upon which it is was placed, and any metadata associated with the mail item. In each instance where a unique mail item identifier 202 is already marked upon the mail item, it is read and interpreted by the barcode verification system 124 and 126 to validate its integrity and ensure it is applied properly to the mail item (event 312). As before, any metadata associated with the mail item is also recorded, so that the record reflects the IMB 200, the mail item upon which the IMB 200 appeared and any metadata associated with the mail item. The data may be collected on each sorter 102/104 with results returned to the sorter computer 110/112 and/or sorter server 114 for subsequent retrieval, as indicated by the dashed line of FIG. 3.

As a next step in the process, the mail item with applied IMB 200 is directed to one of the plurality of sort bins at the disposal of the sorter 102/104 (event 314). The sort bin decision, as stated previously, is based at least in part on the sort scheme applied and/or the delivery point identifier 212 (11-digit ZIP Code) as marked.

Having completed the sort step, a final data store to the sorter computer 110/112 and/or sorter server 114 is performed for associating the sort bin data as defined by the sort scheme with each respective IMB 200 marked mail item and corresponding unique mail item identifier and metadata stored previously (event 316). The resultant final data set, on a per-item basis in this example, is sufficient for associating each mail item to a particular postal sort group to which it belongs; data which includes but is not limited to: mailer identifier 208, unique number 210 (alternatively, an ACS match back code 210), delivery point identifier 212 (e.g., 11 digit ZIP data), a sort bin number to which the mail item was directed, sort scheme ZIP designation as defined by the sort scheme for that particular sort bin and other metadata associated with the mail item such as customer profile data or customer identifier value (CRID), sorter profile data, etc. However, as has been described herein, the unique mail item identifier 202 (the combination of at least the mailer identifier 208 and the unique number 210) serves as the reliably unique identification for each mail piece or item.

Event 318, which may occur concurrently or periodically during sorter 102/104 operations, provides further means of associating mail items with valuable data pertaining to each IMB 200 and the included mail item identifier. When filled to capacity or when all mail items intended for a particular bin have arrived, mail items with the IMB 200 as marked thereon may be swept into mail trays with applied tray labels 360. A tray label scanner 370 may be employed to read and decode the tray labels, and this information may also be sent to the sorter computer 110/112 and/or sorter server 114. Each tray label 360 may include its own unique identifier. In this way, each respective tray may be associated with a specific sort bin and its related sort scheme ZIP designation. Those skilled in the art will recognize that these relationships may be further linked to the postal sort group and/or the associated IMB 200 marked mail items sorted into the postal sort group.

Events 306 through 318 are continued for all mail items until all of the mail for the client is processed (event 320). Once complete, the data as stored to the sorter computer 110/112 and/or sorter server 114 may be leveraged to generate postal authority required documentation (event 322). This may include, but is not limited to a postage summary report, a mail makeup report and a mail item report. The mail makeup report and mail item report may indicate some of the various metadata, postal sort group and associated unique mail item identifier 202 data as gathered during sort operations. In particular, the mail item report may indicate the one or more associated unique mail item identifiers 202 that correspond to a particular postal sort group (e.g., a postal ZIP scheme). The item report may also identify an associated tray label for each unique mail item identifier 202. The mail makeup report may indicate the sort scheme and sort bin designation data that is relevant to the mailer. In addition, mail item data for a specific sort scheme designation may be maintained for use in performing subsequent pass validation, which may facilitate easier loading of client data and scheme information for performance of the subsequent pass. Accordingly, the use of the unique mail item identifier 202, specifically one that conforms to postal authority standard, allows an individual mail item to be tracked through a mail processing environment 100, into a specific tray or group of trays corresponding to a particular postal sort group and into a subsequent mail processing environment 100. Using a conforming unique mail item identifier 202 facilitates the seamless transfer of data across mail processing environments 100, including those operated independently of each other and enables the unique mail item identifier 202 to be embedded in a conforming data encoding structure, such as the IMB 200 described herein.

Those skilled in the art will appreciate that the examples presented herein enable a mail item marked with a unique identifier to be associated with its respective postal sort group within a document processing environment. While the various examples pertain primarily to a sorter or multi-sorter environment primarily, those skilled in the art will recognize that any document processing environment may take advantage of the aforementioned techniques, including mail preparation or inserter-based environments. Furthermore, it will be recognized by skilled artisans that the techniques and concepts described herein relate to functions of document processing environments, including pre-sort bureaus, shared mailing networks, captive shops, inbound or outbound sorting environments and the like.

As shown by the above discussion, aspects of the document processing environment and associated processing of mail item data are controlled or implemented by one or more processors/controllers, such as one or more of the sorter computers 110 and 112 and/or the sorter server 114. Typically, each such processor/controller is implemented by one or more programmable data processing devices. The hardware elements operating systems and programming languages of such devices are conventional in nature, and it is presumed that those skilled in the art are adequately familiar therewith.

For example, the processor/controller may be a PC based implementation of a central control processing system, or may be implemented on a platform configured as a central or host computer or server. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and tracking or postage data generated in response to the sorting operations, as discussed in detail above. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems and in the case of the sorter computers for communication with the reader and sorting hardware elements. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a sorter computer may include a graphics subsystem to drive the output display. The output display, for example, may include a cathode ray tube (CRT) display, or a liquid crystal display (LCD) or other type of display device. Although not shown, a PC type system implementation typically would include a port for connection to a printer. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network (to implement the desired processing, in this case, including those for processing mail item data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant mail processing as well as software programming, for controlling the relevant functions. A software or program product, which may be referred to as an "article of manufacture" may take the form of code or executable instructions for causing a computer or other programmable equipment to perform the relevant data processing steps regarding mail item tracking or processing, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the system of FIG. 1 in the computer platform of the server 114 and/or into one or both of the sorter computers 110 and 112. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Nonvolatile storage media include, for example, optical or magnetic disks, such as any of the storage devices in any computer (s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the previous description, numerous specific details are set forth, such as specific materials, structures, processes, etc., in order to provide a better understanding of the present subject matter. However, the present subject matter can be practiced without resorting to the details specifically set forth herein. In other instances, well-known processing techniques and structures have not been described in order not to unnecessarily obscure the present subject matter.

Only the preferred embodiments of the present subject matter and but a few examples of its versatility are shown and described in the present disclosure. It is to be understood that the present subject matter is capable of use in various other combinations and environments and is susceptible of changes and/or modifications within the scope of the inventive concept as expressed herein. It is intended by the following claims to claim any and all applications, modifications and variations that fall within the true scope of the present teachings.

What is claimed is:

1. A sorter system comprising:

a reader device adapted to capture data as marked upon a plurality of mail items;

a processor/controller adapted to:

(a) obtain data for a first unique mail item identifier from a postal code read by the reader device from a first mail item already having a postal code conforming to a postal authority standard thereon; and (b) generate and assign a second unique mail item identifier conforming to postal authority standard to a second mail item read by the reader device that does not already having a postal code conforming to postal authority standard thereon; and a sorter associated with the processor/controller adapted to sort the first and second mail items based on a delivery point for each of the first and second mail items, respectively; and the processor/controller configured for storing metadata and delivery point in association with the first and second unique mail item identifiers, wherein the first and second unique mail item identifiers include:

a mailer identifier, identifying a mailer sending the first and second mail item; and a first and second unique number assigned to the first and second mail items respectively, which are maintained as unique with respect to first and second mail items for a specified period of time conforming to a postal authority standard, wherein:

the metadata includes a plurality of: postage application data, weight data, timestamp data, error data, customer profile data, customer identifier value, and sorter profile data, the metadata is obtained from client data stored prior to sorting of the mail items on the sorter, collected and stored during sorting of the mail items on the sorter, and the metadata is not printed on the first and second mail items, and the first and second mail items are associated with a postal sort group to which it belongs on the basis of: its corresponding unique mail item identifier and delivery point, the metadata obtained from client data stored prior to sorting of the mail items on the sorter, and the metadata collected and stored during sorting of the mail items on the sorter is associated with the mail item in the sort group.

2. The system of claim 1, further comprising:

a printer, wherein the processor/controller causes the printer to apply a postal code conforming to postal authority standard containing the assigned second unique mail item identifier to the second mail item.

3. The system of claim 1, wherein each obtained or generated unique mail item identifier comprises:

information identifying a delivery point for the first and second mail items; and an address correction service match back code.

4. A method of generating postal authority documentation for mail items processed by a sorter system, the method comprising steps of:

associating a unique mail item identifier conforming to a postal authority standard, comprising a mailer identifier identifying a mailer sending the mail items and a number which is maintained as unique with respect to each mail item for a specified period of time;

applying a barcode conforming to a postal authority standard to each respective mail item for which a barcode was not already present, the barcode containing at least the unique mail item identifier associated with the respective mail item for which a barcode was not already present;

collecting metadata associated with each respective mail item, wherein the collecting includes:

obtaining metadata from client data and storing the metadata prior to sorting of the mail items on the sorter system, and obtaining metadata and storing the metadata during sorting of the mail items on the sorter system; and storing, in the database, identification of a respective sort group to which each respective mail item is sorted, from among a plurality of sort groups, in association with the unique mail item identifier associated with the respective mail item;

associating the metadata, unique mail item identifier, and delivery point together for each respective mail item sufficient to identify each respective mail item to one of the sort groups to which it belongs;

generating a report from the database, including association of one of the sort groups with mail item identifiers associated with mail items sorted into the one sort group; and reporting the association of selected metadata with each unique mail item identifier for each of the mail items sorted, wherein the metadata includes a plurality of: postage application data, weight data, timestamp data, error data, customer profile data, customer identifier value, and sorter profile data, and the metadata is not printed on the mail items.

5. The method of claim 4, wherein the step of storing identification of the respective sort group to which each respective mail item is sorted includes storing identification of a tray or group of trays into which each respective mail item is sorted.

6. The method of claim 4, wherein the step of associating the unique mail item identifier with each respective one of the processed mail items comprises:

reading a barcode and obtaining the unique mail item identifier from the read barcode for each respective mail item for which a barcode was already present; and generating the unique mail item identifier for each respective mail item for which a barcode was not already present, for use in the applying step.

7. An article of manufacture, comprising:

at least one machine readable storage medium; and program instructions embodied in said storage medium, wherein execution of the program instructions by at least one programmable computer associated with a document processing system causes the programmable computer to control the document processing system to perform functions comprising:

associating a unique mail item identifier conforming to a postal authority standard, comprising a mailer identifier identifying a mailer sending the mail items and a number which is maintained as unique with respect to each mail item for a specified period of time;

applying a barcode conforming to postal authority standard to each respective mail item for which a barcode was not already present, the barcode containing at least the unique mail item identifier associated with the respective mail item for which a barcode was not already present;

collecting metadata associated with each respective mail item, wherein the collecting includes:

obtaining metadata from client data and storing the metadata prior to sorting of the mail items on the sorter system, and obtaining metadata and storing the metadata during sorting of the mail items on the sorter system;

storing, in a database, identification of a respective sort group to which each respective mail item is sorted, from among a plurality of sort groups, in association with the unique mail item identifier and metadata associated with the respective mail item;

associating the metadata, unique mail item identifier, and delivery point together for each respective mail item sufficient to identify each respective mail item to one of the sort groups to which it belongs;

generating a report from the database, including association of one of the sort groups with mail item identifiers associated with mail items sorted into the one sort group; and reporting the association of selected metadata with each unique mail item identifier for each of the mail items sorted, wherein the metadata includes a plurality of: postage application data, weight data, timestamp data, error data, customer profile data, customer identifier value, and sorter profile data, and the metadata is not printed on the first and second mail items.

* * * * *